No. 669,867. Patented Mar. 12, 1901.
S. M. WADE.
SPEED GEAR.
(Application filed July 25, 1900.)

(No Model.) 2 Sheets—Sheet 1.

WITNESSES:
Johna Burghton
J. B. Owens.

INVENTOR
Sedgwick M. Wade.
BY Munn & Co.
ATTORNEYS

THE NORRIS PETERS CO., PHOTO-LITHO., WASHINGTON, D. C.

No. 669,867. Patented Mar. 12, 1901.
S. M. WADE.
SPEED GEAR.
(Application filed July 25, 1900.)
(No Model.) 2 Sheets—Sheet 2.

WITNESSES:
Johna Bergstrom
J. B. Owens.

INVENTOR
Sedgwick M. Wade.
BY Munn & Co
ATTORNEYS

UNITED STATES PATENT OFFICE.

SEDGWICK MILLS WADE, OF ANDOVER, OHIO.

SPEED-GEAR.

SPECIFICATION forming part of Letters Patent No. 669,867, dated March 12, 1901.

Application filed July 25, 1900. Serial No. 24,783. (No model.)

*To all whom it may concern:*

Be it known that I, SEDGWICK MILLS WADE, a citizen of the United States, and a resident of Andover, in the county of Ashtabula and State of Ohio, have invented a new and Improved Speed-Gear, of which the following is a full, clear, and exact description.

This invention is a means for transmitting motion and for varying the speed and direction thereof. It is applicable to all forms of machinery in which rotary movements are transmitted; but it is especially designed for use on motor-vehicles.

This specification is the disclosure of one form of the invention, while the claims define the actual scope thereof.

Reference is to be had to the accompanying drawings, forming a part of this specification, in which similar characters of reference indicate corresponding parts in all the views.

Figure 1:
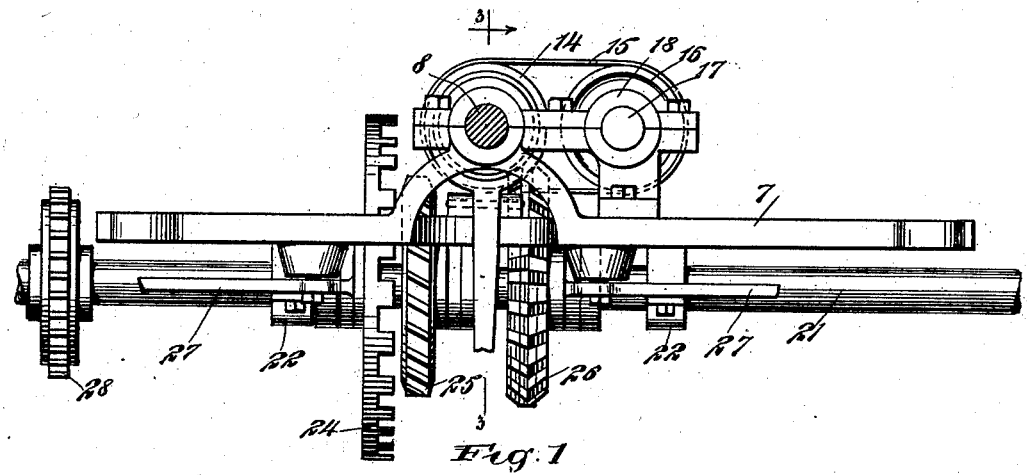
Figure 2:
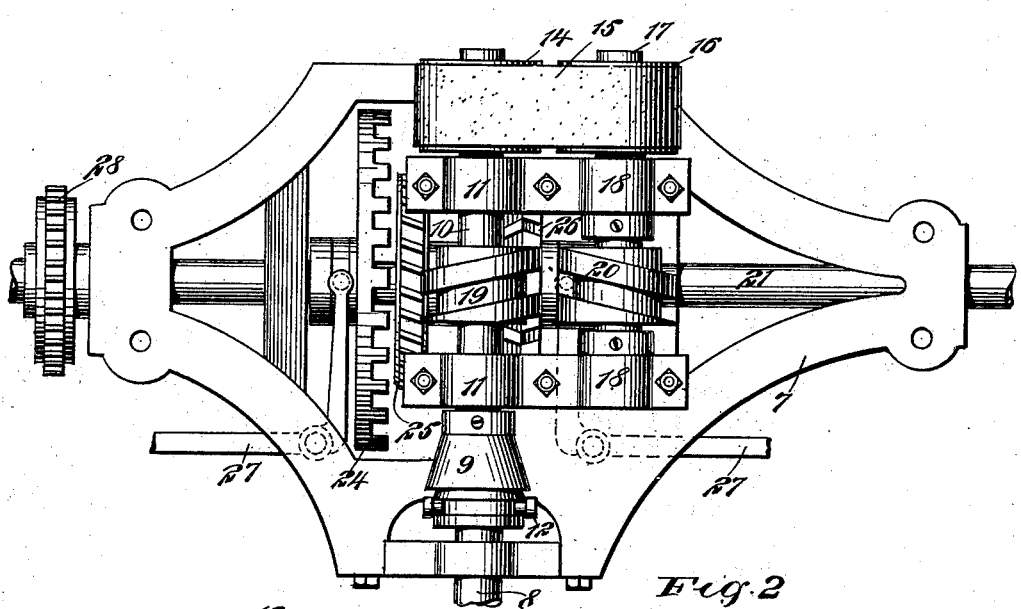
Figure 3:
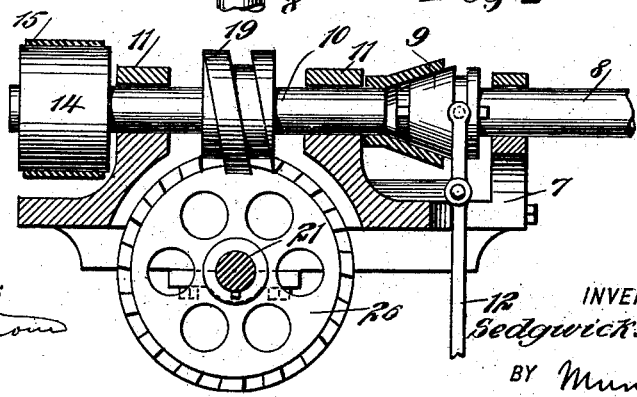
Figure 4:
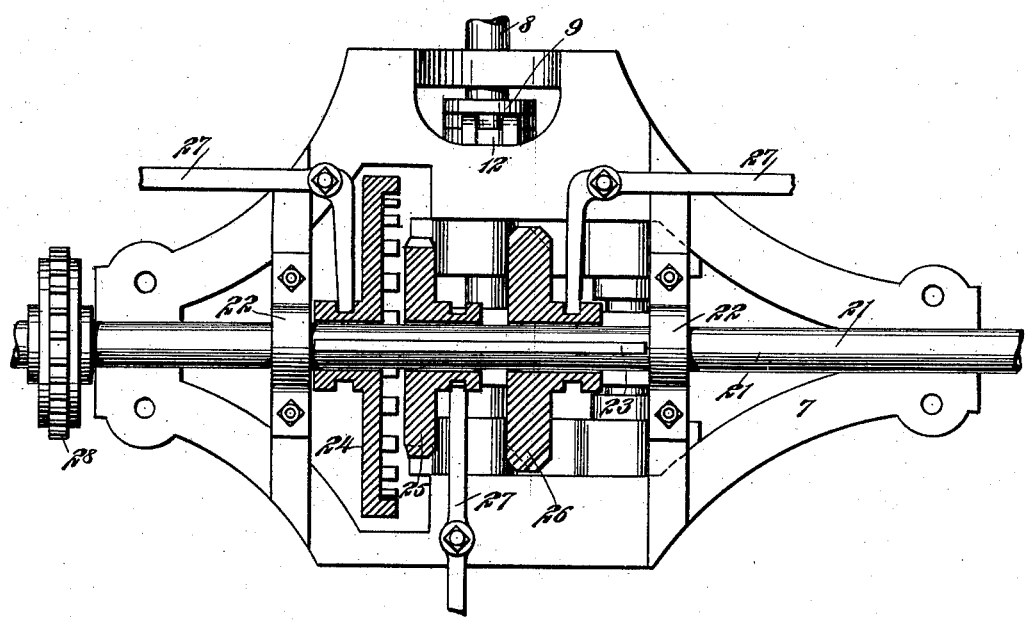

Figure 1 is a side elevation of the invention. Fig. 2 is a plan view thereof. Fig. 3 is a section on the line 3 3 of Fig. 1. Fig. 4 is a bottom plan view of the invention with parts in section.

In practice it is desirable to inclose all of the parts of the gear in a hermetic case and to fill the same with oil, so as to keep the parts thoroughly lubricated and to prevent them from becoming clogged with dust and other forms of dirt. This case I have, however, not illustrated in the drawings and it forms no part of my invention. The various elements of the gearing are mounted on a frame 7. A drive-shaft 8 is mounted in a part of the frame 7 and is arranged to be connected by a clutch 9 with a shaft 10, which is carried revolubly in boxes 11, supported on the frame. A hand-lever 12 is provided for the operation of the clutch 9. This clutch is a friction-clutch, which enables the shaft 10 to be gradually connected with the shaft 8 and it avoids a rapid starting of the shaft 10. The shaft 10 has a pulley 14 on the end opposite the clutch 9, and over this pulley runs a belt 15, which passes around a similar pulley 16 on a shaft 17, mounted parallel with the shaft 10 and carried in boxes 18, similar to the boxes 11. The shaft 17 is thus driven revolubly in the same direction as that of the shaft 10. The shaft 10 carries a worm 19, and the shaft 17 carries a worm 20. The worms 19 and 20 have their threads reversed with respect to each other. The parts 14, 15, and 16 may be substituted by any desired gear for driving the worms 19 and 20, since said parts are not material.

A driven shaft 21 is carried on the under side of the frame 7 in boxes 22, and on this shaft is formed a feather 23, extending between the boxes 22. The shaft 21 has fitted loosely thereon and situated between the boxes 22 a crown worm-wheel 24, a spur worm-wheel 25, and a double-bevel worm-wheel 26. These wheels slide on the shaft 21, but do not turn thereon. Operating-levers 27 are provided for the respective wheels 24, 25, and 26. The double worm-wheel 26 is situated between the worms 19 and 20 and is movable to engage either one of these worms. When the wheel 26 is engaged with the worm 19, the shaft 21 is driven in one direction, and when the wheel 26 is engaged with the worm 20 the shaft 21 is driven in the reverse direction. The spur worm-wheel 25 is placed adjacent to the worm 19, so as to mesh therewith, and thus turn the shaft 21 in the same direction that it is turned when the wheel 26 meshes with the worm 19. The wheel 25 is smaller than the wheel 26, and consequently the shaft 21 is driven faster by the wheel 25 than by the wheel 26. The crown worm-wheel is arranged to engage with the worn 19, and when this takes place the shaft 21 is driven in the same direction as it is driven by the gears 25 and 26. The wheel 24 is the largest of the wheels, and it drives the shaft 21 slower than either of the other wheels 25 and 26. It will therefore be seen that I provide a means for driving the shaft 21 in one direction at either one of three different speeds and that I provide means for driving the shaft in an opposite and reverse direction at a single speed.

In applying this gearing to motor-vehicles, for example, the gears 24 and 25 and the gear 26 when arranged with the worm 19 will serve to drive the shaft 21 ahead, and the gear 26 when meshed with the worm 20 will serve to drive the shaft 21 backward or to reverse the movement of the vehicle. The precise adjustment of gears is not, however, essential.

Movement may be transmitted from the shaft 21 by any means—for example, by a sprocket-wheel or other gear 28.

While the arrangement here shown is capable of driving only at three different speeds, it is clear that by increasing the number and varying the size of the gears which mesh with the worm 19 the number of speeds may be increased.

Having thus described my invention, I claim as new and desire to secure by Letters Patent—

1. A speed-gear, comprising two worms driven in the same direction, and a double worm-wheel movable to engage either one of the worms.

2. A speed-gearing comprising a worm, a spur worm-wheel movable to engage therewith, and a crown worm-wheel of a size different from that of the spur worm-wheel, the crown worm-wheel being also movable to engage the worm.

3. A speed-gearing comprising a worm, a bevel worm-wheel movable to mesh therewith, and a spur worm-wheel also being capable of being meshed therewith, the worm-wheels being of different sizes.

4. A speed-gearing, comprising two worms driven in the same direction, a double-bevel worm-wheel situated between the worms and movable to engage either one thereof, a spur worm-wheel movable to engage one of the worm-wheels, and a crown worm-wheel, also movable to engage one of the worms, all of said worm-wheels being of different sizes.

5. A speed-gear, comprising two driven worms arranged to impart movement in different directions, and a double worm-wheel movable to engage either of said worms, for the purpose specified.

In testimony whereof I have signed my name to this specification in the presence of two subscribing witnesses.

SEDGWICK MILLS WADE.

Witnesses:
F. J. BISHOP,
F. H. PITKIN.